United States Patent [19]
Lemnell

[11] Patent Number: 5,900,818
[45] Date of Patent: May 4, 1999

[54] ANIMAL TRACKING SYSTEM

[75] Inventor: Per Arne Lemnell, Ramsberg, Sweden

[73] Assignee: Televilt International AC, Lindesberg, Sweden

[21] Appl. No.: 09/053,054

[22] Filed: Apr. 1, 1998

[51] Int. Cl.$^6$ ................................................ G08B 23/00
[52] U.S. Cl. .................................. 340/573.3; 340/691.3; 343/901
[58] Field of Search ............................. 340/573.2, 573.3, 340/689, 691.1, 691.3, 326, 539, 328; 343/900, 901; 381/56, 110; 359/142, 148

[56] References Cited

U.S. PATENT DOCUMENTS

| | | | |
|---|---|---|---|
| 3,336,530 | 8/1967 | Sloan et al. | 340/573 |
| 4,528,566 | 7/1985 | Tyler | 343/419 |
| 4,885,800 | 12/1989 | Ragle | 455/66 X |
| 4,887,549 | 12/1989 | Powell | 119/718 |
| 5,241,923 | 9/1993 | Janning | 340/573 X |
| 5,289,163 | 2/1994 | Perez et al. | 340/573 X |
| 5,603,094 | 2/1997 | Greear, Jr. | 455/66 |
| 5,652,569 | 7/1997 | Gerstenberger et al. | 340/573 |

*Primary Examiner*—Thomas Mullen
*Attorney, Agent, or Firm*—Dickinson-Wright PLLC

[57] ABSTRACT

The present invention relates to a tracking system for indicating the direction and behavior of an animal such as a hunting dog. The system generally comprises a radio frequency transmitter for mounting on the animal's collar and a hand-held receiver which is capable of detecting and indicating not only the location of the animal but its behavior. The transmitter has a detector connected to a CPU which generates pulse train signals depending on the barking characteristics of the animal. The receiver receives the signals and indicates the animal's barking characteristics by light or sound signals and/or pulses. These indications help the user determine the animal's behavior, such as when the animal travels beyond ordinary sight and hearing range, which can be useful in hunting applications.

6 Claims, 4 Drawing Sheets

ANIMAL TRACKING SYSTEM

BACKGROUND

The present invention relates to an animal tracking system including a transmitter mounted on a collar and a hand-held radio receiver, and particularly to an animal tracking system having means for indication of the animal behaviour.

Tracking systems using radio frequency transmitters and receivers for detecting the direction or position of an animal, or a person or any other object are well known, U.S. Pat. No. 5,289,163 discloses a child monitoring device which monitors the position of a child by detecting the signal strength of a radio frequency carrier from a transmitter attached to the child. If the signal of the radio frequency carrier is too weak, the child is too far away from the adult who has the child position monitoring device. When this happens, the adult is informed that the child has wandered too far away through the use of an audio tone or through the use of vibrations coming from the device. Once the adult is notified that the child is too far away, the device also has a locating display for indicating the relative direction of the child with respect to the adult. The display uses eight LEDs arranged around an emblem used to represent the position of the adult. The LED which lights up indicates the relative direction of the child.

Another publication, U.S. Pat. No. 4,885,800, discloses a transmitter attachment for hunting arrows including a hollow tubular member. The tubular member has a transmitter mounted in one end and a battery in the other end. When the arrow hits the target the transmitter is energised. A directional receiver is utilised to locate the arrow.

To control the whereabouts of a pet or an animal, a system disclosed in U.S. Pat. No. 5,241,923 can be employed. Said system uses one or more transponders to establish a boundary. The transponders receive an incident signal from a transmitter and generate a distinguishable return signal which, when the animal moves into proximity of the boundary, is received by a unit arranged on the animal to initiate application of an aversive stimulus which deters the animal from traversing the boundary.

Another more relevant prior art publication is U.S. Pat. No. 5,603,094, disclosing a radio tracking system adapted for domestic pets wearing collars. The system comprises a transmitting unit attached to the collar of the animal and a hand held receiver unit indicating strength of signals sent from the transmitting unit through illumination of a plurality of LED lamps. The receiver is pointed in a variety of directions, until a direction is identified which results in the strongest indicated signal, which illuminate more lamps than are illuminated when the receiver is pointed in other directions. This indicates the location of the animal wearing the transmitter.

Similar tracking systems preferably intended for hunting purposes are the Trackers® FTV466B and FTV 660 systems provided by Fintracker in Finland.

Neither of the above mentioned prior art tracking systems detects or indicates any particular behaviour of the tracked animal. However, an already known tracking system of the inventor has a motion detector. When a dog, wearing a transmitter of the system, does not move for some reason, the transmitter starts sending a particular signal to a receiver of the system used by the owner of the dog. The receiver indicates the signal to the user in a suitable way, such as by a light indicator or an audio signal. Since the direction also can be detected by the receiver the owner can find the dog and rescue it.

SUMMARY

The object of the present invention is to provide an improved tracking system, offering additional functions to the user of a receiver according to the invention, i.e. detection and indication of the behaviour of an animal wearing a transmitter in order to for example look after and estimate the working behaviour of a dog in a hunting situation.

This object is accomplished by the system according to claim 1, wherein a radio frequency transmitting device has barking detector means connected to a CPU for generating pulse train signals depending on the barking characteristic of the dog or another call or cry from an animal. Further, a radio receiving device has frequency adjustment means for adjustment to the frequency of said signals, a signal strength indicator, a second battery supply device, and barking indicator means for indication of said pulse train signals for the user.

An advantage of this barking indication generating a unique pulse train signal for each type of barking is that it is helpful in observing and evaluating the behaviour of the dog when hunting or tracking even when the dog is out of earshot. Another advantage is when several dogs are used on a relatively small area. When more than one dog is barking at the same time the user can recognise the barking of its own dog and depending on the indicated signal determine if the dog scents an animal and follows a trace.

Another aspect of the invention is that said radio frequency transmitting device further comprises an IR-receiver connected to said CPU of said radio frequency transmitting device to receive signals to control the power of said transmitting device and the frequency of said signals, and that said radio receiving device further comprises an IR-remote unit, activated by a user via control means for controlling the power and said frequency of said signals.

Still an aspect of the invention is that said radio receiving device further comprises amplifier means and amplifying adjustment means for controlling the amplification of said received signals.

A further aspect of the invention is to provide a signal strength indicator comprising loudspeaker means providing an audio signal having a frequency level depending on the signal strength.

An advantage of this function is that a variation in the frequency of the tone is easier to detect for the user than a variation of the signal amplitude.

Still an aspect of the invention is to provide position detecting means for detection of the current position of the transmitter and also the animal wearing it.

The user of the system benefits from this feature when it is used on a dog at bird hunting in the forest. If the dog scents a bird in a tree the dog sits on its haunches or stands on its hind legs with its forelegs on the tree-trunk. Then the position detecting means detects the inclination of the transmitting device worn by the dog, and a signal indicating the inclination is transmitted to the receiving device, thereby drawing the attention of the user to the situation.

BRIEF DESCRIPTION OF THE DRAWINGS

The present invention will be described in detail in the following description with reference to the accompanying drawings, in which.

DESCRIPTION OF A PREFERRED EMBODIMENT

A tracking systems according to the invention uses radio frequency transmitters and receivers for detecting the direction or position of an animal, or a person or any other object, and detecting and indicating the behaviour of an animal wearing a transmitter in order to for example look after and estimate the working behaviour of a dog in a hunting situation.

Figure 1:
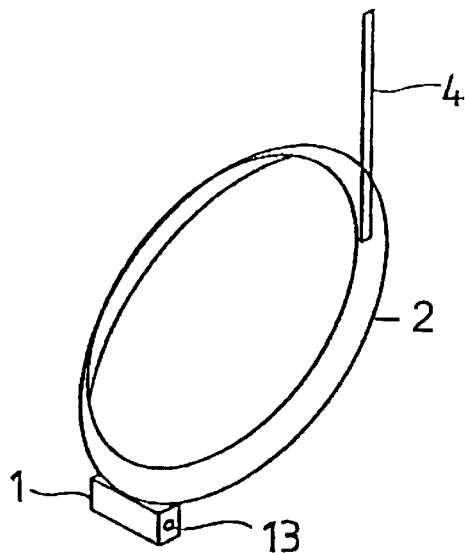
FIG. 1 is a schematical, perspective view of a radio frequency transmitting device according to the invention mounted on a collar.
Figure 2:
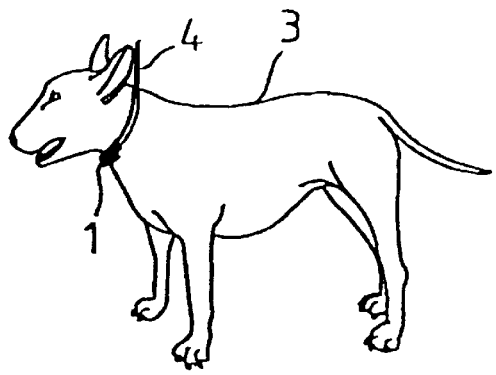
FIG. 2 shows a dog wearing said collar.
Figure 3:
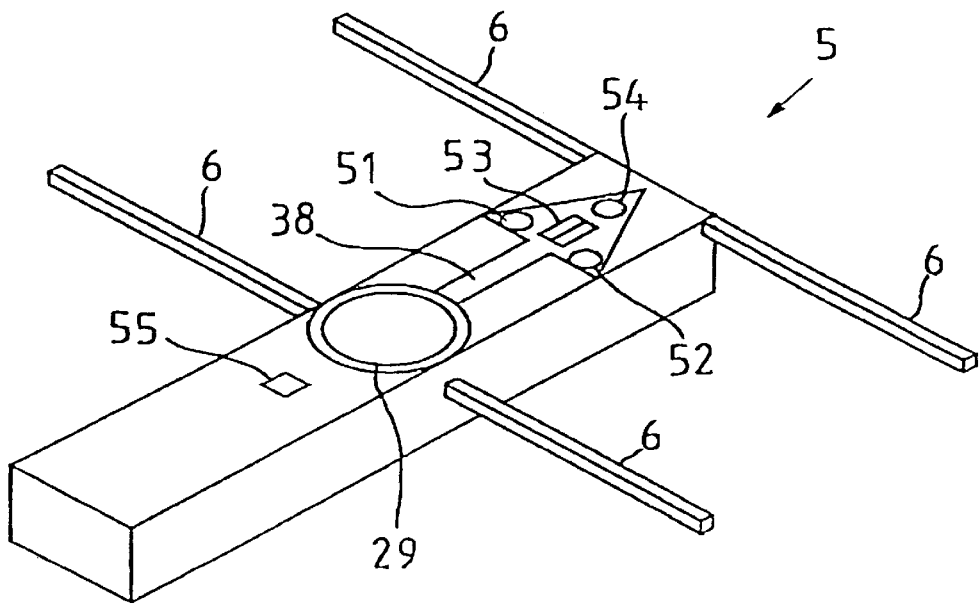
FIG. 3 is a schematical, perspective view of a radio receiving device according to the invention.

With reference to FIGS. 1, 2 and 3, the equipment according to the invention comprises a radio frequency transmitting device 1 mounted on a collar 2 to be worn by an animal, preferably a dog 3. Said transmitting device is connected to a first antenna 4 for transmitting of signals. Further, the equipment comprises a radio receiving device 5, shown in FIG. 3, having second antennas 6, namely four foldable telescopic antennas in the embodiment, which is used by the user or owner of the dog.

Figure 4:
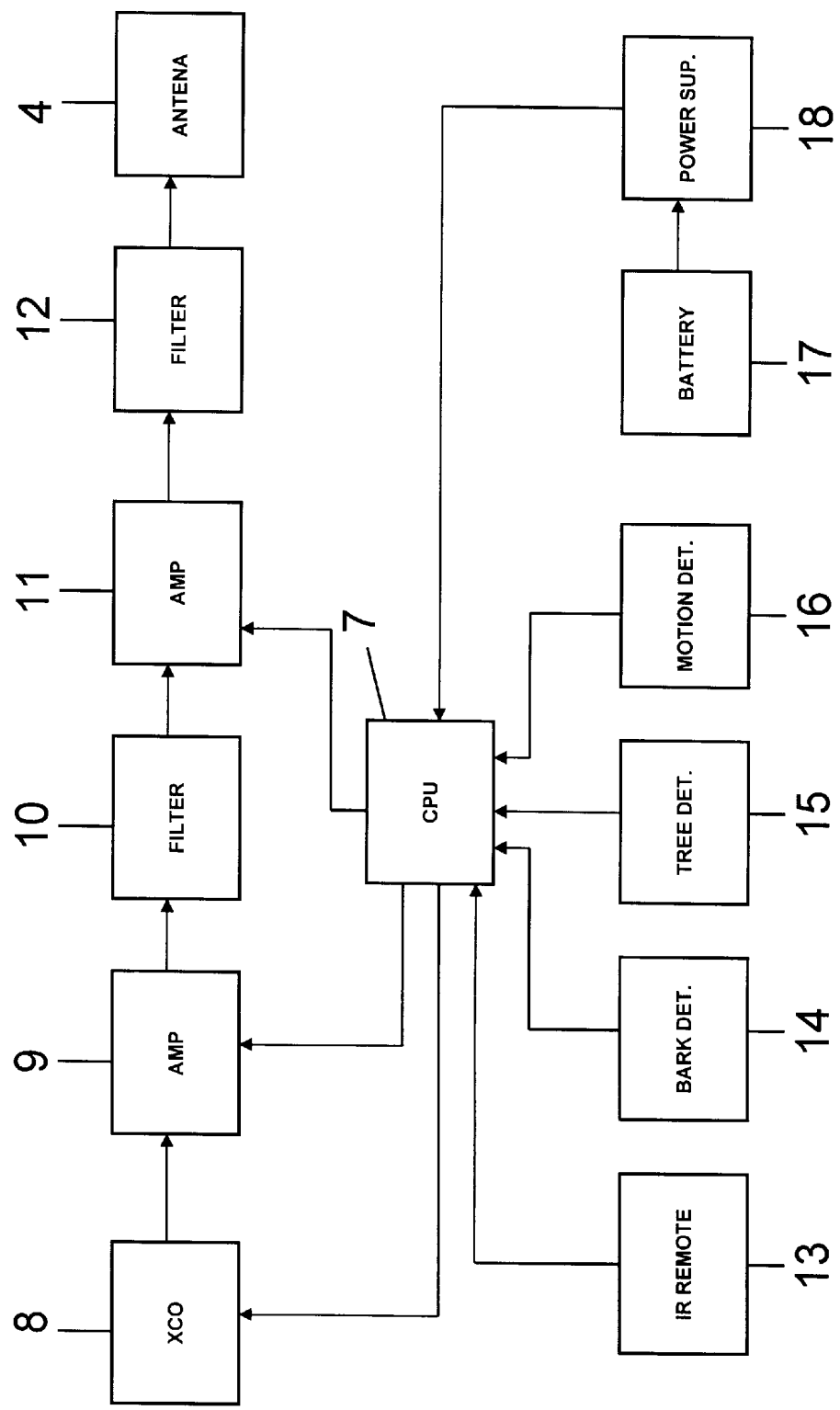
FIG. 4 is a block diagram of a first embodiment of the radio frequency transmitting device in FIG. 1.

A block diagram of a first embodiment of the transmitting device 1 is shown in FIG. 4. The transmitting device 1 contains a CPU 7 for controlling the function of the transmitting device and its components. Transmitting means for transmission of signals is connected to said CPU 7. The transmitting means comprises an XCO unit (Crystal Controlled Oscillator) 8, generating the frequency of the signals to be transmitted, a pulsed carrier controlled by the CPU, a first amplifier 9 connected to an output of said unit 8, amplifying the signal, a first filter 10 connected to the output of said first amplifier 9, filtering the signal, a second amplifier 11 connected to the output of said filter 10, for additional amplification of the signal, a second filter 12 connected to the output of said amplifier 11, filtering the signal from said amplifier, and the antenna 4 connected to the output of said filter 12. The crystal oscillator 8 and the two amplifiers 9 and 11 are controlled by the CPU 7 to generate a pulsed signal of a predetermined amplitude and frequency.

Said radio frequency transmitting device 1 further comprises an IR-remote receiver 13 connected to said CPU for receiving signals controlling the power of said transmitting device and in another embodiment also the frequency of the signals to be sent. The radio receiving device 5, shown in FIG. 3, sends an IR-signal to the radio transmitting means 1 to activate or deactivate it. The radio transmitting means 1 can only be activated or deactivated by radio receiving devices 5 according to the invention, minimising the risk for manipulation of the system by an unauthorised person.

An important object of the system according to the invention is to detect and indicate the behaviour of an animal wearing a transmitter in order to for example look after and estimate the working behaviour of a dog in a hunting situation. Therefore, the transmitting device 1 is provided with a bark detector 14 connected to the CPU 7 via a capacitor microphone and a CPU interface, not shown. It responds to sound or noise, particularly barking of a dog. Each barking causes the CPU 7 to generate specific pulse train signals depending on the barking characteristic of the dog. These signals are received by barking indicator means of the receiving device 5, informing the user of the behaviour of the dog. At hunting, a particular barking generates unique pulse train signals which can give an indication of that the dog has picked up a trail of an animal. This barking indication generating a unique pulse train signal of each type of barking is helpful in observing and evaluating the behaviour of the dog when hunting or tracking even when the dog is out of earshot. Another advantage is when several dogs are used on a relatively small area. When more than one dog is barking at the same time the user can recognise the barking of his own dog and depending on the indicated signal determine if the dog scents an animal and follows a trace.

Position detecting means called a tree detector 15 is connected to the CPU 7. The tree detector 15 detects the current position of the transmitter and also the dog in the meaning for if the dog stands, lies or is in another position. When using a dog for bird hunting in the forest the tree detector 15 is useful. If the dog scents a bird in a tree the dog sits on its haunches or stands on its hind legs with its forelegs on the tree-trunk. Then the tree detector 15 detects the inclination of the transmitting device worn by the dog and a signal indicating the inclination is transmitted to the receiving device 5, thereby drawing the attention of the user to the situation.

With a motion detector 16 connected to the CPU 7 the user or owner of the dog is informed if the dog does not move for any reason, wherein the dog may be injured and can not move. Then the dog can be found and rescued.

A first battery unit 17 is connected to a power supply unit 18, which is connected to the CPU for the power supply of the receiving device 1. An indication of that the battery needs to be charged is detected by a battery level detector, not shown, and this information is sent to the receiving device where it is indicated through a LED on the front panel. As described above the on/off function of the power is controlled through the IR-remote receiver 13, activated from the receiving device 5.

Figure 5:
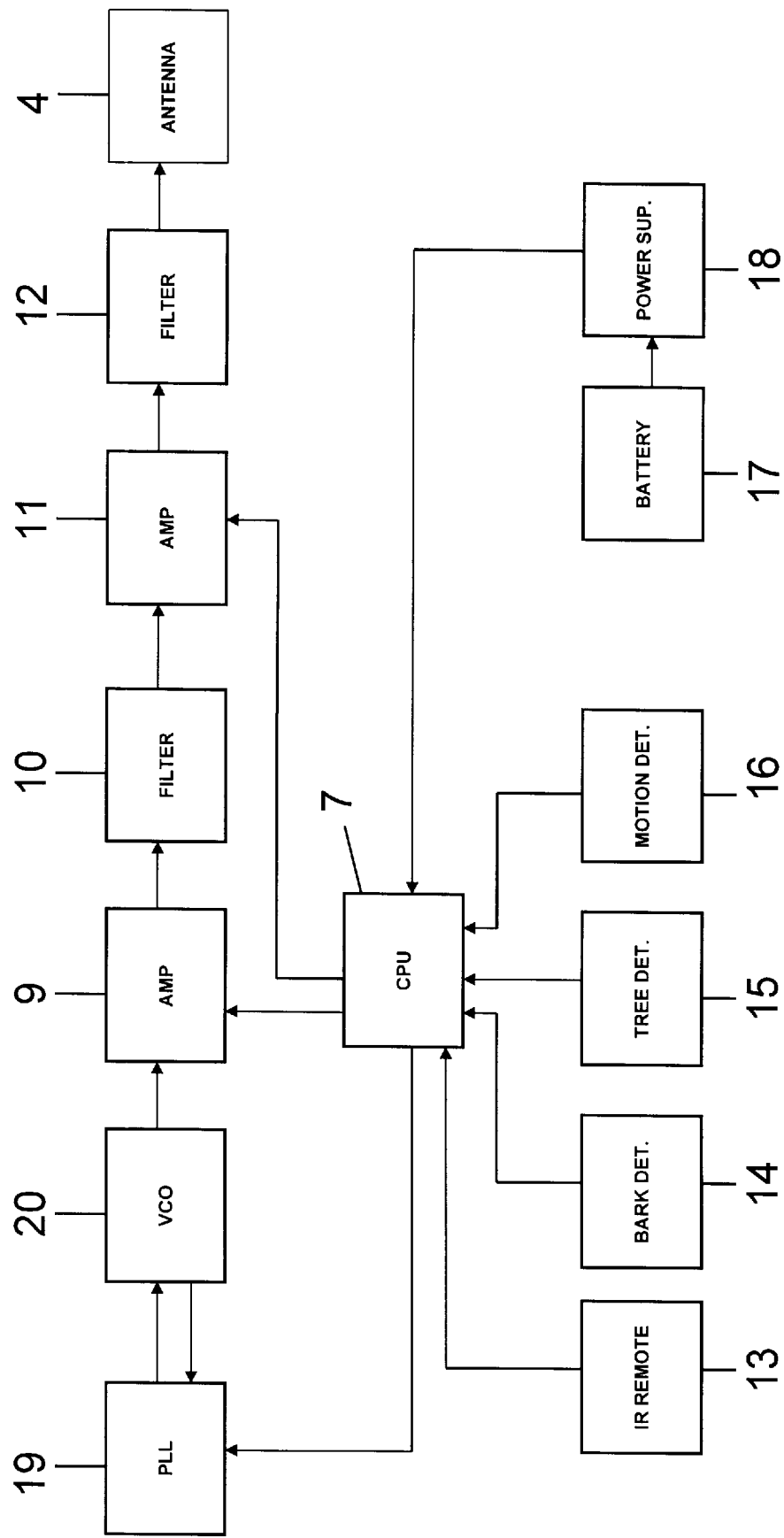
FIG. 5 is a block diagram of a second embodiment of the radio frequency transmitting device in FIG. 1.

Another embodiment of the transmitting device 1 is illustrated by a block diagram in FIG. 5. This embodiment is provided with a frequency synthesiser comprising a PLL (Phase Locked Loop) 19 and a VCO (Voltage Controlled Oscillator) 20. The frequency synthesiser is connected to and controlled by the CPU 7. A particular frequency channel is selected by the user on the receiving device 5, described in further detail later. Then the transmitting device 1 is turned on and is activated to send pulsed signals to the receiving device 5 at the selected frequency. Otherwise, the embodiment of FIG. 5 has similar blocks and components as the first embodiment described in conjunction with FIG. 4.

Figure 6:
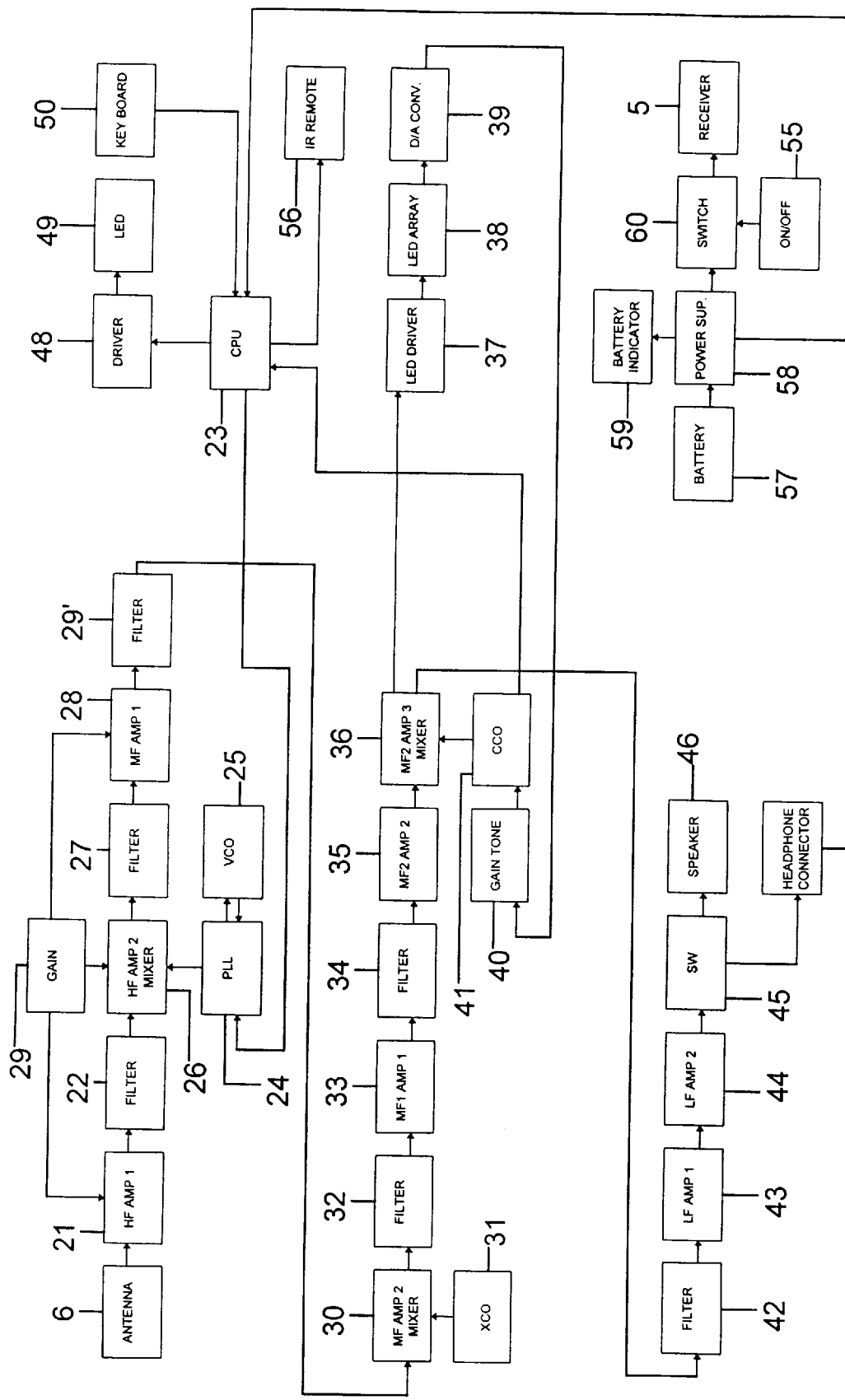
FIG. 6 is a block diagram of an embodiment of the radio receiving device in FIG. 3.

The receiving device 5 is described in detail in a block diagram in FIG. 6. It is a dual superheterodyne synthesised receiver in the embodiment. As described above the receiving device has an antenna with four antenna rods in the embodiment, represented by a block 6 in FIG. 6. A received signal is lead to a first high frequency amplifier 21, the output of which is connected to the input of a first high frequency filter 22. Frequency selection is performed by synthesising controlled by a CPU, a RISC processor 23 in the embodiment. Thus, the frequency selection is performed by a second PLL and a second VCO 25 controlled by the CPU 23. The PLL 24 controls a high frequency mixer 26 connected to the output of said filter 22. The output signal of the mixer 26 is a medium frequency signal forming an input to a first medium frequency filter 27, the output of which is connected to the input of a first medium frequency amplifier 28. The amplification can be regulated by a gain control or potentiometer 29. The output of the amplifier 28 is connected to the input of a second medium frequency filter 29', the output of which is connected to a medium frequency mixer 30 controlled by a crystal oscillator 31, determining the actual frequency division, generating a second medium frequency. The input of a third medium frequency filter 32 is connected to the output of the mixer 30, and the output of the filter 32 is connected to the input of a second medium frequency amplifier 33. Said amplifier is further connected to a fourth medium frequency filter 34, connected to a third medium frequency amplifier 35, the output of which is connected to a second medium frequency mixer 36.

A first output of said mixer is connected to an input of an LED driver 37, driving an LED array 38, forming a signal strength indicator, arranged on the front side of the receiving device 5. The indicator presents the signal strength by illuminating a number of LED lamps in the array 38, wherein a large number of illuminated LEDs corresponds to a strong signal received and, thus, a small number of illuminated LEDs corresponds to a weak signal. Hence, if the receiving device 5 is directed towards the transmitting device 1 a larger number of LEDs are illuminated than if the receiving device 5 is directed away from the transmitting device 1. Then it is possible to determine the direction of the transmitting device 1 and also the dog 3 relative to the receiving device 5. However, this kind of tracking is known by prior art tracking systems.

An output of said array 38 is connected to a D/A converter 39, connected to frequency effecting means including a gain tone unit 40, the output of which is connected to a CCO (Ceramic Controlled Oscillator) 41, controlling the mixer 36 to generate a signal on its second output, having a frequency dependent on the signal strength. In one embodiment, the stronger the received signal from the transmitter device 1 is the higher frequency of the output signal is generated on the second output of the mixer 36. The latter signal is applied on the input of a first low frequency filter 42, the output of which is connected to a two step amplifying stage comprising first and second low frequency amplifiers 43 and 44. The amplified signal is applied on the input of a switch 45, switching the signal between either a speaker 46, arranged on the outside of the receiving device 5, and/or a headphone connector 47. This function is also called a peak detector. The advantage of this function is that a variation in the frequency of the tone is easier to detect for the user than a variation of the signal amplitude.

Further, the CPU 23 controls a driver 48, driving front panel LEDs 49, thereby enabling the system to be used even in the darkness.

The receiving unit is activated and controlled through a key board 50 having several buttons. Referring again to FIG. 3, the front panel has control buttons 51 and 52 for channel selections, and a channel indicator 53 indicating the current channel used. Also an IR-control button 54, an on/off switch 55 and the potentiometer 29, controlling the amplification of the tone signal, are arranged on the front panel of the receiving device 5. The IR control button 54 activates an IR-remote unit 56, shown in FIG. 6, sending IR signals to the transmitting device in order to activate the transmitting device to send signals at a particular frequency as described above.

Finally, the receiving device 5 has a battery 57 as power source for the device. The battery is connected to a power supply unit 58, connected to the CPU 23, and a battery indicator 59. Said on/off button 55 controls an on/off switch 60, activating the complete receiver device 5.

What is claimed is:

1. A tracking system for indicating the direction of an animal and its behaviour comprising:

a radio frequency transmitting device attached to a collar for an animal, said transmitting device having a housing containing a CPU for controlling the function of said transmitting device, transmitting means for transmission of signals connected to said CPU, a first battery supply device connected to said transmitter, an antenna connected to said transmitter, and barking detector means connected to said CPU for generating pulse train signals depending on the barking characteristic of the animal;

a radio receiving device, including frequency selecting means for selection of the frequency of said signals, a signal strength indicator, a second battery supply device, and barking indicator means for indication of said pulse train signals.

2. A tracking system according to claim 1, wherein said radio frequency transmitting device further comprises an IR-receiver connected to said CPU, for receiving signals controlling the power of said transmitting device and the frequency of said signals, and said radio receiving device further comprises an IR-remote unit, activated by a user via control means for controlling the power and said frequency of said signals.

3. A tracking system according to claim 1, wherein said radio receiving device further comprises amplifier means and amplifying adjustment means for controlling the amplification of said received signals.

4. A tracking system according to claim 3, wherein said signal strength indicator comprises frequency effecting means and loudspeaker means providing an audio signal having a frequency level depending on the signal strength.

5. A tracking system according to claim 3, wherein said signal strength indicator comprises an LED array illuminating a number of LEDs depending on the signal strength.

6. A tracking system according to claim 1, wherein said radio transmitting device further comprises position detecting means, for detection of the current position of the transmitter and also the animal wearing it.

* * * * *